June 5, 1956 C. W. WILDEBOUR 2,748,886
DEAERATORS
Filed Feb. 1, 1954
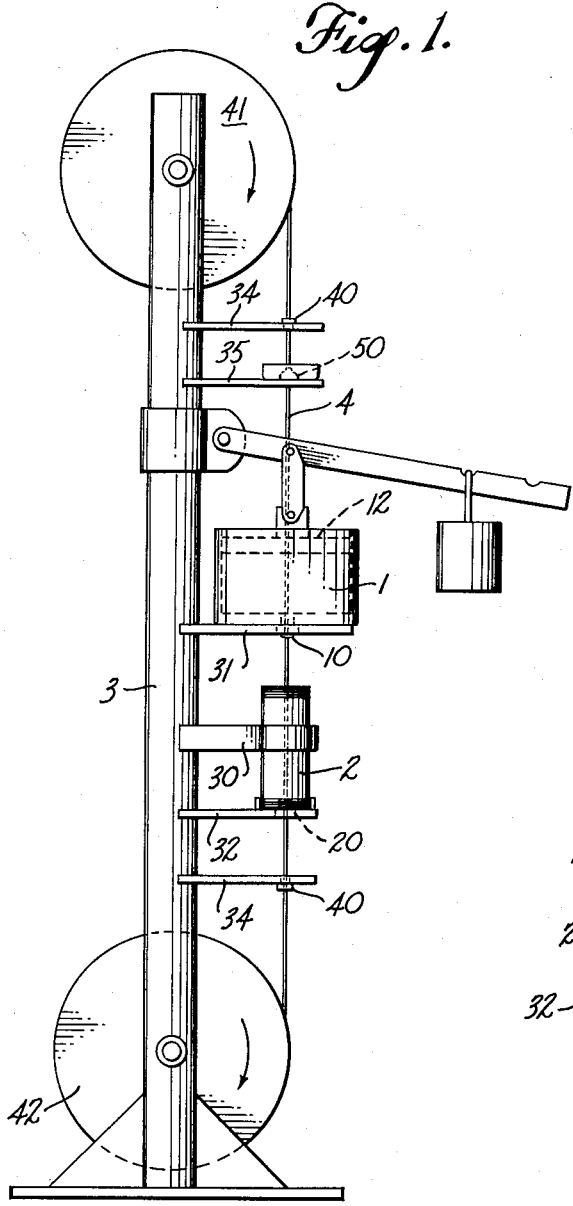
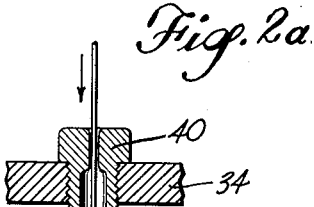
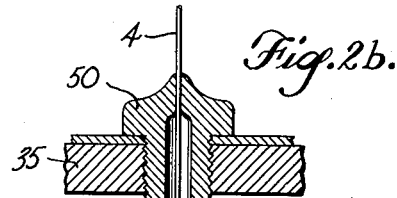
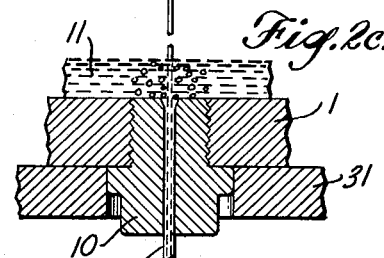
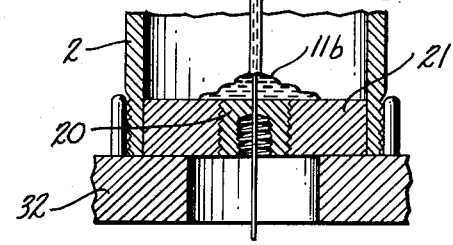
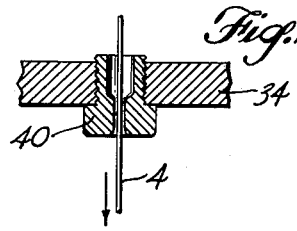
INVENTOR.
CHARLES W. WILDEBOUR
BY Reynolds, Beach & Christensen
ATTORNEYS

United States Patent Office 2,748,886
Patented June 5, 1956

2,748,886
DEAERATORS

Charles W. Wildebour, Seattle, Wash., assignor to Boeing Airplane Company, Seattle, Wash., a corporation of Delaware Application February 1, 1954, Serial No. 407,429

7 Claims. (Cl. 183—2.5)

Pressurized cabins of high altitude airplanes must be sealed at all joints with a tacky joint sealant or caulking compound, which is a liquid or paste. If there is air entrapped within the sealant when the latter is applied to the joints, at ground level, this air (usually in the form of many tiny bubbles) expands at higher altitudes, and this expansion opens the joint and causes leakage of air from within the cabin. Thus the entrapped air of the sealant defeats the very purpose for which the sealant is used.

The sealant when delivered from the manufacturer ready for use, or when mixed by the user, is found always to contain these air bubbles. The sealant being tacky, it is extremely difficult to break the individual bubbles and to release the air, or to eliminate it in any way. Since low pressure at high altitude has been the cause of the bubbles' undesired expansion, it has been attempted to expand them by high vacuum and so to cause them to burst, and thus to eliminate them prior to applying the sealant to the joint. The tackiness of the liquid sealant, in bulk volume, prevented bursting or escape of the bubbles, notwithstanding their expansion under such conditions. No way has been discovered heretofore, so far as I am aware, to rid the tacky sealant of the bubbles, and so to solve the problem of leakage arising from their presence in the applied sealant.

I have discovered that the entrapped air can be removed from the sealant by a process analogous to stripping, when applied to a thin film adhered to or backed by a non-yielding backing element. Such a film-coated element is passed through an aperture or past a stripper element at a spacing sufficiently large—with relation to the tackiness of the sealant—that the liquid film will pass readily, but sufficiently small that the air bubbles contained in the film are either held back or are squeezed and burst to release their air.

This invention relates to the method broadly outlined above, and which will be more specifically described hereinafter, and to the mechanism devised for performing the method conveniently, reasonably rapidly, and effectively as applied to the specific ultimate end, the loading of a caulking gun with air-free sealant, ready for application to the joints. Those characteristics which are believed to be new, both as to the method and as to the mechanism, will be set forth in the claims. It will be understood that this disclosure, including the drawings, is intended to be illustrative rather than restrictive, and that various modifications may be made to the same without departing from the novel principles of this invention. In particular, although the invention has come into being to solve the problem of deaerating a given type of joint sealant, in its broader aspects it is applicable to deaerate various liquids, of different degrees of tackiness, as will be evident from an understanding of the principles of this invention.

Figure 1 is a side elevational view of complete apparatus suited to carrying out the invention.

The several individual views of Figure 2 collectively represent the several successive guides and dies of the mechanism, in enlarged views, Figure 2a being the upper wire guide, Figure 2b being the upper stripper or cleaning die, Figure 2c being the extrusion die, Figure 2d being the lower or main stripper die, and Figure 2e being the lower wire guide.

The sealant compound is applied by discharging it from a caulking gun, normally of cylindrical form, through a nozzle under the pressure of a piston which is forced through the cylinder towards the nozzle. Such cylinders must be charged with a supply of the tacky liquid, often from a bulk supply. While the sealant as supplied contains entrapped air, often more air is entrapped in the operation of charging the gun. Accordingly, by the present invention provision is preferably made for charging a caulking gun cylinder, hereinafter termed the receiver, with the liquid delivered from a suitable container, hereinafter termed the reservoir. Such a reservoir 1 is suitably supported with relation to a receiver 2; preferably, and for a reason which will appear later, the receiver is directly beneath the reservoir. Each may be supported from the standard 3, by means of the brakets 31, 32, and 30.

The reservoir 1 is apertured in its bottom to receive an extrusion die 10. The expelling piston 21 may constitute the bottom of the receiver 2; and it is apertured also to receive a stripper die 20. Preferably these dies, and in particular their apertures, are directly vertically aligned, although such alignment is not, in the broadest aspects, of the essence of the invention, notwithstanding it is highly desirable for best results.

A wire or similar non-yielding backing element 4 extends through the reservoir 1 and its die 10, and through the receiver 2 and its die 20. Conveniently such wire is reeled off a supply reel 41 supported at the top of the standard 3 and onto a receiving reel 42 supported at the bottom of the standard. Upper and lower wire guides 40 are supported on brackets 34 from the standard, and being aligned with the dies 10 and 20, maintain the wire always properly in alignment with such dies. The reel 42 may be driven at a suitable rate and by any convenient means (not shown), to advance the wire downwardly.

As the downwardly moving wire enters the reservoir 1 the liquid tends to adhere to and to shroud its exterior. The size of the aperture in the extrusion die 10 is enough larger than the diameter of the wire that, having regard to the tackiness of the liquid at 11 contained within the reservoir, the die 10 will permit an adhering film of the liquid to exit with the wire. On the other hand, the size of this die's aperture is small enough that any air bubbles contained in the putative film, as the wire approaches the die, are either wiped therefrom or are squeezed and burst; only a thin film of the liquid, that which is adhered to the wire, can escape through the die 10 so long as the wire nearly fills the die. Whatever may be the explanation of the cause, the result of the relationship and operation just described is, in effect, to strip the air bubbles from the film as the backing wire and adhered film exit from the die 10, and to deliver with the down-running wire a substantially air-free film of liquid, as indicated at 11a in Figures 2c and 2d.

It remains only to collect such air-free liquid within the receiver 2 without entrapping air in it. To this end the stripper die 20 is of a size to embrace the bare wire 4 closely. As the film-coated wire passes downwardly through the die 20 the die strips the liquid film from the wire, and the liquid collects at 11b (Figure 2d) in the bottom of the receiver 2.

The dies 10 and 20 are each removably mounted, as are also the guides 40. A worn die can be replaced, or dies of different sizes or shapes can be substituted, always in correspondence with the wire 4 or equivalent backing member used.

In order to clear the wire of any adhering moisture, previously adhered film residue, scale, or other foreign matter, it may be desirable to run the wire through a stripper or cleaning die 50, supported on the bracket arm 35 of the standard, located intermediate the upper guide 40 and the reservoir 1, and aligned with the several dies and guides. This cleans the wire 4 just before it enters the liquid in the reservoir 1.

A weighted piston 12 bears upon the upper surface of the liquid 11 within the reservoir, urging it outwardly through the aperture in the die 10, to the extent permitted by the film-forming clearance between the wire and the walls of that die's aperture.

In a typical and illustrative operation, the joint sealant intended for sealing the joints in the pressurized compartment or cabin of an airplane is supplied from the reservoir 1, usually in measured quantities calculated to fill the receiver 2. A wire of .033 diameter has previously been threaded through the successive guides and dies, and secured to the lower reel 42. The guide bushings 40 may be of 1/16" diameter, and the upper stripper die 50, if used, would be of .033" diameter. The extrusion die 10, for this particular liquid and wire size, is of .0635" diameter, wherefore the liquid film will be approximately .0152" thick. The size of this die must be related to the particular liquid and its degree of tackiness, as well as to the wire size, hence it is not possible to state that size nor that relationship except relatively. The stripper die 20 is .033", to clean the film from the exiting wire. If the several dies and guides were not quite accurately aligned, the wire would not run freely through them, and unless the wire ran downwardly and quite directly from the reservoir to the receiver, the film might tend to run, and to collect in blobs that might collect air, or drip off. If the film were of appreciably uneven thickness, air might not be forced from its thicker portion.

It may be found desirable, as a surface seal, to cover the surface of the liquid, as it collects within the receiver, with water or a like immiscible liquid, to exclude air from contact with the collecting sealant.

Care must be taken to clean all parts of old sealant prior to reuse of such parts. It is advantageous to continue reeling in of the full length of wire, onto reel 42, for this assures stripping of sealant film from the wire at a time when that film is most readily removed.

Upon completion of the transfer of liquid from the reservoir to the receiver the latter is removed, a nozzle-bearing head is applied to its upper end, and its bottom becomes its extruding plunger.

I claim as my invetnion:

1. Mechanism for deaerating a tacky liquid such as is capable of forming a film of given minimal thickness, capable of adhering to a clean surface, which thickness is less than the diameter of the smallest air bubble capable of existing in such liquid, such mechanism comprising, in combination, a reservoir, a receiver therebelow, each apertured in its bottom, a clean-surfaced wire of given and uniform diameter extending successively through the apertures in the bottoms of the reservoir and the receiver, an extrusion die closing the aperture in the bottom of the reservoir and embracing the wire with clearance all around just sufficient to pass a film of such minimal thickness, a stripper die closing the aperture in the bottom of the receiver, and embracing the wire with approximately zero clearance, and means for the advancement of the wire downwardly in the direction of its length, through the reservoir to entrain a downwardly moving shroud of the liquid contained therein, of indeterminate and unlimited thickness, such as will include air bubbles which may be present in such liquid, then through the extrusion die to strip off the air bubbles and all liquid in excess of a film of the given minimal thickness, devoid of air bubbles, then into the receiver, and finally through the stripper die to strip off the deaerated film of liquid and to deposit such liquid upon the bottom of the disclosed receiver, passing only the bare wire through said stripper die.

2. Mechanism as and for the purpose indicated in claim 1, including means to support the reservoir and the receiver the first above the second, and with their respective dies in substantially vertical alignment, the wire-advancing means being arranged to advance the wire directly downwardly past the extrusion die and into the receiver and so through the stripper die.

3. Mechanism as and for the purpose set forth in claim 1, including a cleaning stripper die of a size and located to closely embrace the wire in its movement immediately in advance of its entrance into the reservoir.

4. A method of deaerating a tacky liquid such as is capable of forming a film of given minimal thickness, capable of adhering to a clean surface, which thickness is less than the diameter of the smallest air bubble capable of existing in such liquid, which method comprises passing a clean-surfaced wire through a reservoir containing such liquid to entrain a shroud of the liquid, of indeterminate thickness such as will include air bubbles which may be present in such liquid, and through an extrusion die which is enough larger than the diameter of the wire to pass an adhering film of such liquid, but small enough, with relation to the tackiness of the liquid, to pass a film of only the given minimal thickness, hence devoid of any air bubbles.

5. A method of deaerating a tacky liquid such as is capable of forming a film of given minimal thickness, capable of adhering to a clean surface, which thickness is less than the diameter of the smallest air bubble capable of existing in such liquid, and collecting the liquid in deaerated condition, which method comprises passing a clean-surfaced wire downwardly through a reservoir containing such liquid to entrain a shroud of the liquid, of indeterminate thickness such as will include air bubbles which may be present in such liquid, and through an extrusion die which is enough larger than the diameter of the wire to pass an adhering film of such liquid, but small enough, in relation to the tackiness of the liquid, to pass a film of only the given minimal thickness, hence devoid of any air bubbles, and immediately passing the wire with its film through a receiver, to exit therefrom through a stripper die which is of a size to closely embrace the bare wire.

6. The method set forth in claim 5, wherein the wire is advanced substantially vertically and directly from the extrusion die of the reservoir to and through the receiver and its stripper die.

7. The method of deaerating a tacky liquid such as is capable of forming a film of given minimal thickness, capable of adhering to a clean surface, which thickness is less than the diameter of the smallest air bubble capable of existing in such liquid, and collecting the liquid in deaerated condition, which method comprises spreading the liquid in a film upon a clean-surfaced solid backing element, and passing such film-coated element past a first stripper at a spacing between the two which is large enough to pass a film of the liquid of the given minimal thickness, and then past a second stripper at substantially zero clearance.

References Cited in the file of this patent

UNITED STATES PATENTS

| | | |
|---|---|---|
| 1,746,580 | Crouse | Feb. 11, 1930 |
| 1,882,459 | Tyner | Oct. 11, 1932 |
| 2,341,450 | Knaus | Feb. 8, 1944 |
| 2,375,971 | Windschauer | May 15, 1945 |
| 2,382,868 | Fink | Aug. 14, 1945 |
| 2,420,356 | Compa | May 13, 1947 |
| 2,458,509 | Grupe | Jan. 11, 1949 |
| 2,545,006 | Ryan | Mar. 13, 1951 |